United States Patent
Felber et al.

(10) Patent No.: US 6,364,942 B1
(45) Date of Patent: Apr. 2, 2002

(54) DEHUMIDIFIER USING NON-ROTATING DESICCANT MATERIAL

(75) Inventors: Steven M. Felber, Eagan; Timothy J. Kensok, Minnetonka; Timothy J. Smith, Minneapolis, all of MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/519,870

(22) Filed: Mar. 6, 2000

(51) Int. Cl.⁷ .......................... B01D 53/04; B01D 53/26
(52) U.S. Cl. .............................. 96/111; 96/127; 96/130
(58) Field of Search .................... 96/111, 112, 124–130, 96/146, 150

(56) References Cited

U.S. PATENT DOCUMENTS

| | | | | |
|---|---|---|---|---|
| 2,124,932 A | * | 7/1938 | Stark et al. | 96/111 |
| 2,237,684 A | * | 4/1941 | Moore | 96/124 X |
| 2,248,225 A | * | 7/1941 | Fonda | 96/111 |
| 2,289,894 A | * | 7/1942 | Zuhlke | 96/129 X |
| 2,471,376 A | * | 5/1949 | Peters | 96/111 X |
| 2,501,280 A | * | 3/1950 | Kemp et al. | 96/111 |
| 2,561,441 A | * | 7/1951 | Lou | 96/112 |
| 2,633,928 A | * | 4/1953 | Chamberlain | 96/111 |
| 3,119,673 A | * | 1/1964 | Asker et al. | 96/112 X |
| 3,368,327 A | * | 2/1968 | Munters et al. | 96/127 X |
| 4,536,198 A | * | 8/1985 | Strain | 96/126 X |
| 4,952,283 A | | 8/1990 | Besik | 165/4 |
| 5,620,367 A | * | 4/1997 | Khelifa | 96/127 X |
| 5,725,639 A | * | 3/1998 | Khelifa et al. | 96/128 X |
| 5,938,523 A | * | 8/1999 | Khelifa et al. | 96/125 X |

FOREIGN PATENT DOCUMENTS

| | | | | |
|---|---|---|---|---|
| JP | 04-317715 A | * | 11/1992 | 96/111 |
| JP | 05-200236 A | * | 8/1993 | 96/112 |

* cited by examiner

Primary Examiner—Robert H. Spitzer

(57) ABSTRACT

A dehumidification system for dehumidifying a conditioned space. The system is comprised of a motionless desiccant block for dehumidifying air within the conditioned space. The system is configured to operate in one of two modes. In a first dehumidifying mode the system draws air from the conditioned space, dehumidifies the air, and returns the air to the conditioned space. In a second regeneration mode the system draws air from outside the conditioned space, heats the air, passes the heated air through the desiccant to dry the desiccant, and expels the air back outside the conditioned space. The system is configured with pivoting dampers to select air source and air destination for the two modes of the system. The system includes blowers in order to motivate the flow of air and a regenerative heater for use during regeneration mode. By utilizing a motionless desiccant block the system avoids the expense and maintenance of desiccant wheels and wheel motors.

9 Claims, 1 Drawing Sheet

DEHUMIDIFIER USING NON-ROTATING DESICCANT MATERIAL

Reference is made to the following copending patent applications all of which were filed on the same date as the present application, and all of which are incorporated in the present application as if fully set forth herein: Ventilating Dehumidifying System Using A Wheel for both Heat Recovery and Dehumidification, application Ser. No. 09/518,924; Heat Recovery Ventilator With Make-up Air Capability, application Ser. No. 09/518,923; Ventilating Dehumidifying System Using A Wheel Driven by Variable Speed Pulsing Motor, application Ser. No. 09/519,516; Ventilating Dehumidifying System, application Ser. No. 09/519,484.

BACKGROUND OF THE INVENTION

The present system relates to air dehumidification and an improved air dehumidification system.

Dehumidifying systems have been used in residential as well as commercial spaces to regulate indoor air quality to provide greater comfort. High humidity levels are not only uncomfortable but can also increase health risks. Living organisms such as bacteria, mold and mildew, thrive on the damp air in air conditioning ducts. For this reason, reducing humidity levels is not only a comfort concern but also a health concern. Homeowners can reduce their exposure to harmful bacteria, mold and mildew by regulating the humidity level within their homes. There exists a need for smaller, less complex, less expensive dehumidification systems that are appropriate for residential use.

Many dehumidifiers currently in use rely on refrigerated cooling coils and compression elements to dehumidify. U.S. Pat. No. 5,179,998, assigned to Deschamps Laboratories, Inc., is one such example using refrigerated coils to aid in dehumidification. Refrigerating coils increase the complexity and expense of the units as well as the input energy necessary to operate the system. Dehumidification can be achieved with less expense by using desiccant materials. Desiccant materials can either adsorb or absorb moisture and then expel that moisture without the need for cooling coils.

Desiccant dehumidifiers of the prior art typically use desiccants in the shape of a wheel. Such a configuration requires a motor to rotate the wheel, adding expense, complexity, and maintenance costs to the system. There exists a need for less complex and less expensive desiccant dehumidifiers.

SUMMARY OF THE INVENTION

In accordance with the present invention there is provided a dehumidification system for dehumidifying a conditioned space. The system is comprised of a unit housing containing a desiccant block, regenerative heater, and blower system. The unit housing acts with the desiccant block to define front and back chambers. In the front end of the unit housing are a front intake aperture and a front exhaust aperture. In the back end of the housing are a back intake aperture and a back exhaust aperture. Each end of the housing also contains a pivoting damper. The dampers move between two positions so that either the intake or exhaust aperture is open while the other is covered by the damper. The system dehumidifies by drawing air from the conditioned space, passing the air through the desiccant block where the block adsorbs moisture from the air and then returning the air back to the conditioned space. When the desiccant block becomes saturated with moisture the system reverses the direction of the air flow and pivots the two dampers so that outside air is drawn into the system, heated by the regenerative heater, then passed through the desiccant block where it removes moisture from the block, and finally expelled back outside. By alternating between these two modes the system economically dehumidifies a conditioned space.

DETAILED DESCRIPTION

Figure 1:
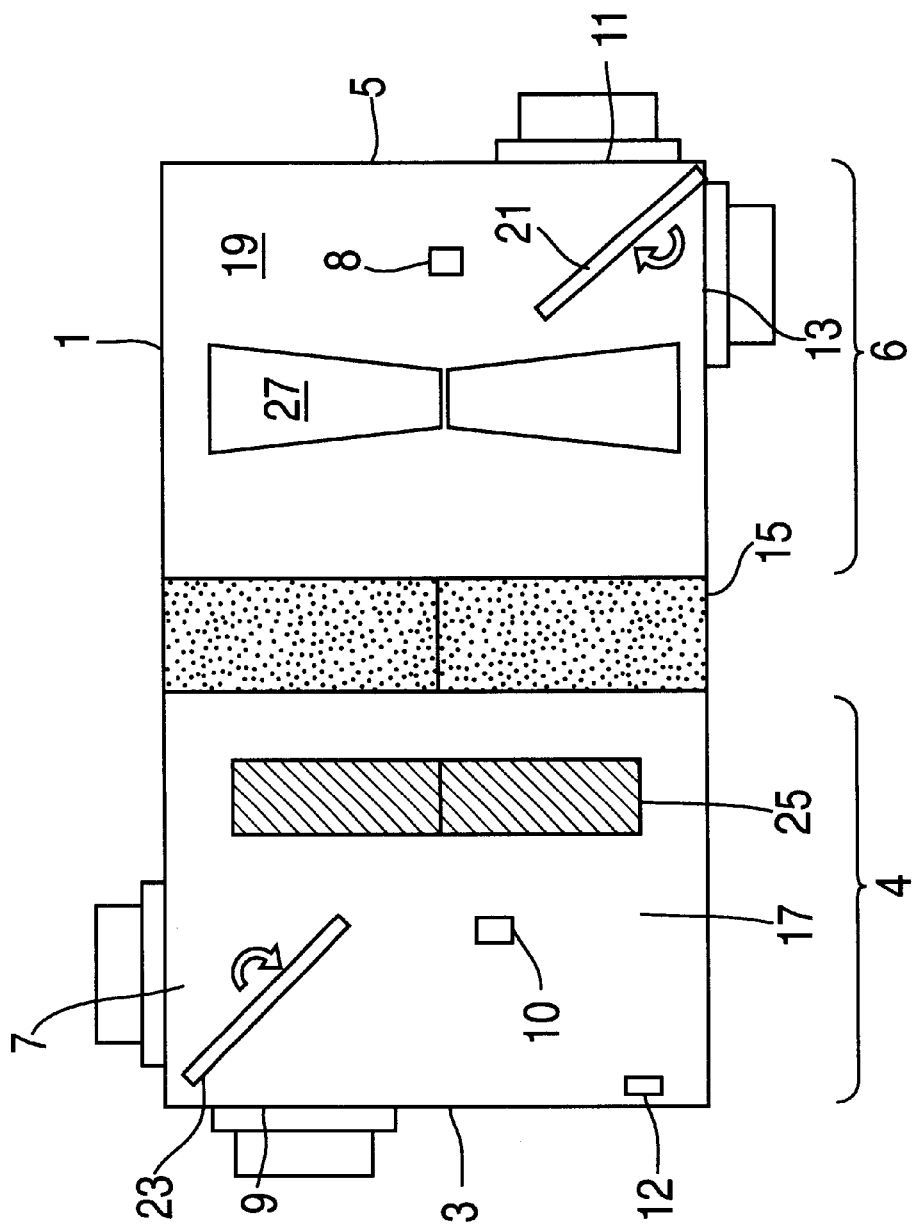
FIG. 1 shows a schematic diagram of one embodiment of the system.

Referring to the drawings, FIG. 1 shows one embodiment of the system for dehumidifying a conditioned space. The system comprises a unit housing 1 typically made of sheet metal or plastic, having both a back panel 5 and a front panel 3. The unit housing 1 is generally rectangular with a front end 4 and a back end 6 making up opposite ends of the rectangular unit housing 1. The front end 4 of the unit housing is separated from the back end 6 by a desiccant block 15.

The back end 6, which includes the back panel 5 as well as portions of the side walls, defines two apertures, the back intake aperture 11 and the back exhaust aperture 13. The back intake aperture 11 is in fluid communication with other piping or ductwork which is itself in communication with inside air. The back exhaust aperture 13 is in fluid communication with other piping or ductwork which is itself in communication with outside air. The back intake aperture 11 is a port through which inside air in need of dehumidification is supplied to the system. The back exhaust aperture 13 is a port through which moisture laden air is discharged to the outside after regenerating the desiccant block 15.

Similarly, the front end 4, which includes the front panel 3 as well as portions of the side walls, defines two apertures, the front intake aperture 7 and the front exhaust aperture 9. The front intake aperture 7 is in fluid communication with outside air or other ductwork which is itself in communication with outside air. The front exhaust aperture 9 is in fluid communication with inside air or other ductwork which is itself in communication with inside air. The front intake aperture 7 is a port through which outside air is drawn into the system in order to regenerate the desiccant block 15. The front exhaust aperture 9 is a port through which the system supplies dehumidified air to the conditioned space.

A front damper 23 is pivotally mounted to the unit housing so that it can close either the front intake aperture 7 or the front exhaust aperture 9. A simple electric motor powers the front damper between a first position which closes the front intake aperture 7, and a second position which closes the front exhaust aperture 9. FIG. 1 shows one embodiment of the system configured so that the front damper 23 rotates only 90° between first and second positions.

A back damper 21 is pivotally mounted to the unit housing so that it can close either the back intake aperture 11 or the back exhaust aperture 13. A simple electric motor powers the back damper between its first position which closes the back exhaust aperture 13, and its second position which closes the back intake aperture 11. FIG. 1 shows one embodiment of the system configured so that the back damper 21 rotates only 90° between first and second positions.

The unit housing contains a motionless desiccant block 15. The desiccant block 15 conforms to the size and shape of the unit housing so that the interior of the unit housing is divided by the desiccant block 15 into front and back chambers 17 and 19. The desiccant block acts to dehumidify a current of air as it passes through small passages within the block. Desiccants are typically formed of a substrate on which desiccant material has been coated or impregnated. Examples of substrate materials include fiberglass, paper, aluminum, and titanium. In one preferred embodiment the substrate is formed of fiberglass. The desiccant may comprise a silica gel. Desiccant materials are commercially available from Munters Corporation.

A stationary block desiccant simply adsorbs moisture from the air stream until the block adsorbs its moisture capacity. At that point the block would need to be dried or regenerated before it could operate to dehumidify again. For this reason desiccants known in the art are shaped like a wheel. Such wheels continually transfer moisture between two air streams, constantly adsorbing moisture in one stream, rotating to the second, less humid air stream, and there releasing the moisture to the air stream. The present system, however, by using a fixed block desiccant avoids the substantial cost, reliability and maintenance issues that accompany the use of motors to spin the desiccant wheels.

A blower system 27 may be placed in the back chamber 19 to motivate an air current either from the back intake aperture 11, through the desiccant block 15 and out the front exhaust aperture 9, or alternatively from the front intake aperture 7, through the desiccant block 15 and out the back exhaust aperture 13. The blower system 27 may be configured as two oppositely oriented blowers or a single reversible one. Examples of blower system 27 include squirrel cage blowers, axial fans, propellers and other devices capable of creating a current of air.

A regenerative heater 25 is placed within the front chamber 17 near enough the desiccant block 15 in order to regenerate or dry the desiccant block when in operation. By heating the air before it passes through the desiccant block 15, more moisture is expelled from the desiccant block 15 to the out-flowing stream of air. The regenerative heater 25 may be configured as an electric heating element, hot water elements, or in one preferred embodiment as a natural gas burner such as is commonly found in clothes dryers.

The system may be configured to operate in two modes. The first mode is the dehumidifying mode. In the dehumidifying mode, the blower system 27 drives the air current from the back end 6 toward the front end 4 of the unit housing 1. When dehumidifying, the back and front dampers 21 and 23 are pivoted so as to leave the back intake aperture 11 and the front exhaust aperture 9 OPEN, while the back exhaust aperture 13 and the front intake aperture 7 are CLOSED. In such a configuration, inside air is drawn from the back intake aperture 11, dehumidified by the desiccant block 15, and then returned to the inside space via the front exhaust aperture 9.

The second mode is the block regenerating mode used to reactivate the desiccant block 15 after it has adsorbed its capacity of moisture. In this mode the blower system 27 drives the air current from the front end 4 toward the back end 6 of the unit housing 1. The dampers 21 and 23 are pivoted so that the front intake aperture 7 and the back exhaust aperture 13 are OPEN, and the front exhaust aperture 9 and the back intake aperture 11 are CLOSED. In such a configuration, outside air is drawn from the front intake aperture 7, heated by the regenerative heater 25, forced through the desiccant block 15 where it removes moisture from the block, and expelled outside through the back exhaust aperture 13.

In order to detect when the desiccant block requires reactivation, sensors 8 and 10 may be configured to measure the humidity of the air before entering the desiccant block and after exiting the desiccant block. When the change in humidity between the two sensors becomes relatively small, the block would require regeneration. The sensors 8 and 10 may also be configured to include thermistors.

The present system may be configured to include a control panel which would enable the user to select the desired mode from the above modes by turning the blower system, regenerative heater and dampers either on or off or to the appropriate positions and directions.

Another embodiment of the system includes both thermisters and RH sensors to measure the temperature and humidity inside or outside the conditioned space. The system may also or alternatively be electrically connected to the home thermostat for monitoring indoor air conditions. When coupled to a controller logic unit 12 the system then may be configured to select automatically the preferred operating mode that will most efficiently achieve desired temperature and humidity levels.

Acceptable thermisters and RH sensors are commercially available and can be ordered from Stetron International, Inc. and TDK USA Corp.. The controller logic unit could be any programmable microprocessor such as a Motorola HC705, JP7 micro-controller.

The above specification, examples and data provide a description of the manufacture and use of the invention. Many embodiments of the invention can be made without departing from the spirit and scope of the invention as defined by the claims below.

We claim:

1. A dehumidifier utilizing a motionless desiccant block comprising:

a unit housing having a front end and a back end, the front end of the unit housing defining a front intake aperture and a front exhaust aperture, the back end of the unit housing defining a back intake aperture and a back exhaust aperture;

a motionless desiccant block disposed within the unit housing and acting with the unit housing to define front and back chambers, the desiccant block extending laterally across the unit housing along a majority of a width of the unit housing;

a back damper pivotally mounted to the back end of the unit housing, the back damper having at least two positions, wherein when the back damper is in a first position it closes the back exhaust aperture leaving the back intake aperture open, and when the back damper is in a second position it closes the back intake aperture leaving the back exhaust aperture open;

a front damper pivotally mounted to the front end of the unit housing, the front damper having at least two positions, wherein when the front damper is in a first position it closes the front intake aperture leaving the front exhaust aperture open, and when the front damper is in a second position it closes the front exhaust aperture leaving the front intake aperture open;

a regenerative heater disposed within the front chamber to increase regeneration of the desiccant block;

a blower system disposed within the unit housing between the front and back dampers for blowing air from the back intake aperture through the desiccant block and through the front exhaust aperture, and also for blowing air from the front intake aperture through the desiccant block and through the back exhaust aperture;

wherein, when the front and back damper are in their first positions, the air blower system propels an air current from the back intake aperture, through the desiccant block where the air current loses moisture, and through the front exhaust aperture, whereby the system works in a first mode as a dehumidifier;

and further wherein, when the front and back damper are in their second positions the air blower system propels an air current from the front intake aperture, through the front chamber where the air current is heated by the regenerative heater, through the desiccant block where the air current adsorbs moisture from the block, and through the back exhaust aperture, whereby the system works in a second mode to reactivate the desiccant block.

2. The dehumidifier of claim 1 wherein the blower system is a reversible blower.

3. The dehumidifier of claim 1 wherein the blower system comprises a first blower for blowing air from the back intake aperture through the front exhaust aperture, and a second blower for blowing air from the front intake aperture through the back exhaust aperture.

4. The dehumidifier of claim 1 further comprising a humidity sensor for measuring the humidity both inside and outside the conditioned space.

5. The dehumidifier of claim 4 further comprising a humidity sensor for detecting when the desiccant requires reactivation.

6. The dehumidifier of claim 5 further comprising a control logic unit that automatically selects to operate the system either in a first mode as a dehumidifier or in a second mode reactivating the desiccant.

7. The dehumidifier of claim 1 further comprising a humidity sensor for detecting when the desiccant requires reactivation.

8. The dehumidifier of claim 1 wherein the first and second positions of the front damper are separated by an angle of approximately 90 degrees.

9. The dehumidifier of claim 1 wherein the first and second positions of the back damper are separated by an angle of approximately 90 degrees.

* * * * *